(12) United States Patent
Iwaida et al.

(10) Patent No.: US 7,057,879 B2
(45) Date of Patent: Jun. 6, 2006

(54) POLARIZABLE ELECTRODE FOR ELECTRIC DOUBLE-LAYER CAPACITOR, PROCESS FOR PRODUCING THE POLARIZABLE ELECTRODE AND PROCESS FOR PRODUCING THE ELECTRIC DOUBLE-LAYER CAPACITOR

(75) Inventors: Manabu Iwaida, Saitama (JP); Shigeki Oyama, Shimotsuga-gun (JP); Kenichi Murakami, Saitama (JP); Kenji Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/536,321

(22) PCT Filed: Nov. 26, 2003

(86) PCT No.: PCT/JP03/15095

§ 371 (c)(1),
(2), (4) Date: May 26, 2005

(87) PCT Pub. No.: WO2004/051680

PCT Pub. Date: Jun. 17, 2004

(65) Prior Publication Data

US 2006/0007639 A1    Jan. 12, 2006

(30) Foreign Application Priority Data

Nov. 29, 2002 (JP) ............................. 2002-349175

(51) Int. Cl.
*H01G 9/00* (2006.01)

(52) U.S. Cl. ...................... 361/502; 361/508; 361/516; 29/25.03

(58) Field of Classification Search ................ 361/502, 361/508–509, 511–512, 516, 528–530, 532; 29/25.03; 502/418, 423, 429, 437, 445 R
See application file for complete search history.

(56) References Cited

U.S. PATENT DOCUMENTS

| | | | | |
|---|---|---|---|---|
| 4,562,511 A | * | 12/1985 | Nishino et al. | ............ 361/324 |
| 4,737,889 A | * | 4/1988 | Nishino et al. | ............ 361/502 |
| 4,862,328 A | | 8/1989 | Morimoto et al. | |
| 5,877,935 A | * | 3/1999 | Sato et al. | ................. 361/502 |
| 6,031,712 A | * | 2/2000 | Kurihara et al. | ............ 361/502 |

(Continued)

FOREIGN PATENT DOCUMENTS

JP    5-304048 A    11/1993

(Continued)

*Primary Examiner*—Anthony Dinkins
(74) *Attorney, Agent, or Firm*—Arent Fox PLLC

(57) ABSTRACT

By using the polarized electrode for electric double layer capacitor of the present invention, which is produced by mixing powdery activated carbon with a binder, and is characterized by the concentration of an organic compound being not more than 300 (ppm), the amount of organic compounds which remain in the pore of the powdery activated carbon decrease, and a possibility of forming the electric double layer by adsorption of electrolytic ion can be prevented. Thereby, an electric double layer is sufficiently formed inside the pore of the powdery activated carbon, and the diffusion resistance between the powdery activated carbon and the electrolyte becomes low. By constituting as such, an electric double layer capacitor with a large electrostatic capacity and a little internal resistance can be obtained.

5 Claims, 6 Drawing Sheets

A     B     C

U.S. PATENT DOCUMENTS

| | | |
|---|---|---|
| 6,094,338 A * | 7/2000 | Hirahara et al. ............ 361/502 |
| 6,104,600 A | 8/2000 | Suhara et al. |
| 6,291,069 B1 * | 9/2001 | Noguchi et al. ............ 428/408 |
| 6,327,136 B1 * | 12/2001 | Meguro et al. ............. 361/502 |
| 2002/0048144 A1 * | 4/2002 | Sugo et al. ................. 361/502 |
| 2002/0163773 A1 * | 11/2002 | Niiori et al. ................ 361/512 |

FOREIGN PATENT DOCUMENTS

| | | |
|---|---|---|
| JP | 7-105316 B2 | 11/1995 |
| JP | 11-317332 A | 11/1999 |
| JP | 2000-49052 A | 2/2000 |
| JP | 2001-84999 A | 3/2001 |

* cited by examiner

POLARIZABLE ELECTRODE FOR ELECTRIC DOUBLE-LAYER CAPACITOR, PROCESS FOR PRODUCING THE POLARIZABLE ELECTRODE AND PROCESS FOR PRODUCING THE ELECTRIC DOUBLE-LAYER CAPACITOR

TECHNICAL FIELD

The present invention relates to a polarized electrode for electric double layer capacitor, producing process thereof, and process for producing an electric double layer capacitor.

Priority is claimed on Japanese Patent Application No. 2002-349175, filed Nov. 29, 2002, the content of which is incorporated herein by reference.

BACKGROUND ART

Since an electric double layer capacitor has a large scale of an F (farad) class and is excellent also in charge-and-discharge cycle characteristics, it is used as a backup power supply of electrical machinery and apparatus, an in-vehicle battery, etc.

The electric double layer capacitor is equipped with a pair of polarized electrodes, a separator arranged between the polarized electrodes, and an electrolyte. The polarized electrode separated with the separator is constituted, respectively so that it may act as an anode plate and the cathode. Activated carbon having pores is usually used as a material of the polarized electrode of such an electric double layer capacitor. Electrolytic ion in an electrolyte is adsorbed in the pore of the activated carbon to form an electric double layer, thereby constituting an anode plate and a cathode of a capacitor, respectively.

As the process for producing the above polarized electrode, a process is disclosed in Japanese Unexamined Patent Application, First Publication No. H07-105316. In this process, a mixture consisting of powdery activated carbon, a fluorine containing polymer resin and a liquefied lubricant (solvent for lubrication) is shaped into a sheet, thereafter the liquefied lubricant is removed by heating, extracting, etc. It should be noted that the document fails to disclose how the liquefied lubricant is removed to what level, specifically.

By the way, the activated carbon which is used in an electric double layer capacitor has originally a character being excellent in the adsorption capability of chemical substances, and this adsorption capability is derived from the existence of the pore of the activated carbon mentioned above. Therefore, when the liquefied lubricant is not sufficiently removed but remained in the pore, formation of the electric double layer by adsorption set of electrolytic ion is prevented, and there is a problem that the internal resistance of the electric double layer capacitor increases.

DISCLOSURE OF THE INVENTION

The present invention was made in view of the above circumstances, and it is an object of the present invention to provide a polarized electrode with little residual volume of the solvent for lubrication, etc., producing process thereof, and process for producing an electric double layer capacitor. In order to solve the above problems, the present invention adopts the followings:

A polarized electrode (for example, a polarized electrode 11 in the best mode for carrying out the invention) for an electric double layer capacitor comprising a mixture of powdery activated carbon (for example, activated carbon 1 in the best mode) and a binder (for example, PTFE2 in the best mode), in which the concentration of an organic compound (for example, the remaining IPA and DIPE, propylene, acetone, etc., in the best mode) contained in the polarized electrode is not more than 300 (ppm) to the weight of the polarized electrode. It should be noted that the binder in the polarized electrode is not included in the organic compound.

According to the above polarized electrode for an electric double layer capacitor, since the concentration of the organic compound contained in the polarized electrode is not more than 300 (ppm) to the weight of the polarized electrode, the amount of organic compounds which remain in the pore of the powdery activated carbon decrease, and a possibility that formation of the electric double layer by adsorption of electrolytic ion is eliminated. It should be noted that the organic compounds which remain in pores may be electrically or chemically denaturalized during working of a capacitor, to be decomposed, thereby deteriorating the characteristics of the capacitor further.

If the concentration of the organic compound is more than 300 (ppm), formation of the electric double layer by adsorption of electrolytic ion is prevented, and the above deficiency will occur, thereby deteriorating the electrode performance as a polarized electrode for electric double layer capacitor, and hence it is not preferred.

Moreover, the polarized electrode (for example, a polarized electrode 11 in the best mode) for an electric double layer capacitor of the present invention is the above polarized electrode for an electric double layer capacitor, in which the concentration of an organic compound (for example, the remaining IPA and DIPE, propylene, acetone, etc., in the best mode) contained in the polarized electrode is ranging from not less than 150 (ppm) to not more than 300 (ppm) to the weight of the polarized electrode.

According to the above polarized electrode for an electric double layer capacitor, since the concentration of the organic compound contained in the polarized electrode is ranging from not less than 150 (ppm) to not more than 300 (ppm), the amount of organic compounds which remain in the pore of the powdery activated carbon decrease, and a possibility that formation of the electric double layer by adsorption of electrolytic ion is eliminated. By this, electric double layer can be formed sufficiently in the pore of the powdery activated carbon, thereby reducing the diffusion resistance between the powdery activated carbon and the electrolyte.

If the concentration of the organic compound is more than 300 (ppm), formation of the electric double layer by adsorption of electrolytic ion is prevented to increase the diffusion resistance between powdery activated carbon and the electrolyte, thereby deteriorating electrode performance as a polarized electrode for electric double layer capacitor, and hence it is not preferred. Moreover, although the concentration of the organic compound being 0 (ppm) is the most preferred, it necessitates in fact to be dried at a high temperature for a long time because of high adsorption power of activated carbon, thereby causing not only elevation of cost but also heat deterioration of the electrode.

If the concentration of the organic compound is within the range of 150 to 300 (ppm), there will be no possibility that formation of the electric double layer may be prevented greatly, the diffusion resistance between the powdery activated carbon and the electrolyte may become excessive, and that electrode performance may deteriorate sharply.

Next, the process for producing a polarized electrode for an electric double layer capacitor includes an electrode forming step of kneading powdery activated carbon (for example, the powdery activated carbon 1 in the best mode), a binder (for example, PTFE2 in the best mode), and an organic solvent (for example, IPA3 in the best mode) for lubrication to be shaped into a sheet (from a material mixing step ST1 to a sheeting and rolling step ST4 in the best mode), which further includes, after the electrode forming step, a vacuum drying step (for example, a vacuum-drying step ST8 in the best mode) of reducing an organic compound (for example, remaining IPA, DIPE propylene, acetone, etc., in the best mode) remained in the electrode by a vacuum drying until the concentration thereof is not more than 300 (ppm) to the weight of the polarized electrode.

Moreover, it is more preferred to remove the organic compounds which remain in the above electrode by the vacuum-drying step, until concentration thereof becomes ranging from not less than 150 (ppm) to not more than 300 (ppm) to the weight of the polarized electrode.

Furthermore, an electrode drying step (for example, a continuous drying step ST6 in the best mode) of heating and removing the organic solvent for lubrication may be performed after the electrode forming step. The amount of the organic compounds which remain in the electrode after performing the electrode drying step is preferably not more than 800 (ppm).

According to the producing process of the above polarized electrode, organic compounds such as an organic solvent for lubrication which remains after the electrode forming step, are removed until its concentration becomes not more than 300 (ppm) by a vacuum-drying step, and hence the amount of the organic compounds which remain within the pore of the powdery activated carbon can be reduced, thereby eliminating possibility of preventing the formation of electric double layer by adsorption of electrolytic ion to the powdery activated carbon. Thereby sufficiently forming the electric double layer within the pore of the powdery activated carbon to obtain a polarized electrode having a low diffusion resistance between the powdery activated carbon and the electrolyte.

Moreover, if the electrode drying step for heating and removing the organic solvent for lubrication is performed after the electrode forming step, most of organic compounds such as an organic solvent for lubrication can be removed before the vacuum-drying step. This enables the organic compounds such as an organic solvent for lubrication which could not be removed in the electrode drying step perfectly, to be removed easily until its concentration becomes not more than 300 (ppm) by a vacuum drying step. That is, the time for performing the vacuum-drying step can be shortened. Whereby it becomes possible to reduce further the amount of organic compounds which remain in the pore of the powdery activated carbon, thereby forming an electric double layer sufficiently inside the pore of the powdery activated carbon to provide a polarized electrode having a low diffusion resistance between the powdery activated carbon and the electrolyte.

Moreover, the process for producing a polarized electrode for an electric double layer capacitor of the present invention is the above mentioned process for producing a polarized electrode for an electric double layer capacitor, in which the organic compound contains at least the organic solvent (for example, the remaining IPA in the best mode) for lubrication which remains after the electrode forming step, and a thermal denaturated product (for example, DIPE in the best mode) which is generated by heating the organic solvent for lubrication in the vacuum drying step.

According to the above process for producing a polarized electrode, at least the organic solvent for lubrication which remains after the electrode forming step, the heat denaturated product which is generated by heating the above organic solvent for lubrication in an early stage of the vacuum-drying step, and a trace of organic impurities contained in the atmosphere of a series of producing processes are adsorbed in the polarized electrode before vacuum drying. By removing these substances by vacuum drying, an electric double layer is sufficiently formed inside the pore of the powdery activated carbon to obtain a polarized electrode having a low diffusion resistance between the powdery activated carbon and the electrolyte.

Next, a process for producing a polarized electrode for an electric double layer capacitor of the present invention is the process for producing a polarized electrode for an electric double layer capacitor (for example, electric double layer capacitor 17 in the best mode) which is constituted from a pair of polarized electrodes prepared by mixing powdery activated carbon (for example, powdery activated carbon 1 in the best mode) with a binder (for example, PTFE2 in the best mode); a separator (for example, separator 13 in the best mode) disposed to between the pair of polarized electrodes (for example, polarized electrodes 11, 11 in the best mode); and an electrolyte, including: an electrode forming step (for example, from the material mixing step ST1 to sheeting and rolling step ST4 in the best mode) of kneading powdery activated carbon (for example, powdery activated carbon 1 in the best mode), a binder (for example, PTFE2 in the best mode), and an organic solvent (for example, IPA3 in the best mode) for lubrication to be shaped into a sheet, a rolling step (for example, a rolling step ST7 in the best mode) of piling the shaped electrode to the separator (for example, separator 13 in the best mode) and rolling it to obtain a rolled body (for example, a rolled body 14 in the best mode), a vacuum drying step (for example, a vacuum-drying step ST8 in the best mode) of inserting the rolled body into a capacitor case, and thereafter drying the rolled body by a vacuum drying to reduce an organic compound remained in the rolled body until the concentration of the organic compound becomes to be not more than 300 (ppm) to the weight of the polarized electrode, and a pouring step (for example, a pouring step ST9 in the best mode) of pouring an electrolyte into the capacitor case.

Moreover, an electrode drying step (for example, a continuous drying step ST6 in the best mode) of heating and removing the organic solvent for lubrication may be added between the above electrode forming step and the above rolling step. The amount of organic compounds which remain in the electrode after performing the electrode drying step is preferably not more than 800 (ppm).

According to the process for producing an electric double layer capacitor, the organic compounds, such as an organic solvent for lubrication which remains after the electrode forming step, are removed until its concentration becomes not more than 300 (ppm) to the weight of the polarized electrode by the vacuum-drying step, and hence it becomes possible to reduce the amount of organic compounds which remain in the pore of the powdery activated carbon, to eliminate a possibility that formation of the electric double layer by adsorption of the electrolytic ion to the powdery activated carbon may be prevented. Thereby, forming an electric double layer sufficiently inside the pore of the powdery activated carbon to provide a polarized electrode having a low diffusion resistance between the powdery activated carbon and the electrolyte.

Moreover, there is no possibility that the organic impurities contained in the atmosphere of a series of producing processes may adsorbed again to the polarized electrode by performing the vacuum-drying step just before the pouring process.

Furthermore, if the electrode drying step of heating and removing the above organic solvent for lubrication between the electrode forming step and the rolling step is performed, most of organic compounds, such as an organic solvent for lubrication, can be removed before the vacuum-drying process. Thereby, organic compounds, such as an organic solvent for lubrication which could not removed at the electrode drying step, can be easily removed until its concentration becomes not more than 300 (ppm) by the vacuum-drying step. By this, it becomes possible to reduce the amount of organic compounds further, which remain in the pore of the powdery activated carbon, and the electric double layer is sufficiently formed inside the pore of the powdery activated carbon to produce the polarized electrode having diffusion resistance between the powdery activated carbon and the electrolyte which is further lowered.

Moreover, the producing process of the electric double layer capacitor of the present invention is a process for producing a polarized electrode for an electric double layer capacitor as mentioned in the above, in which the organic compound contains at least the organic solvent for lubrication (for example, the remaining IPA in the best mode) which remains after the electrode forming step, and a thermal denaturated product (for example, DIPE in the best mode) which is generated by heating the organic solvent for lubrication in the vacuum drying step.

According to the producing process for the electric double layer capacitor, at least the organic solvent for lubrication which remains after the electrode forming step, the heat denaturated product which is generated by heating the organic solvent for lubrication at the early stage of the vacuum-drying step, and a trace of the organic impurities contained in the atmosphere of a series of the producing process are adsorbed in the polarized electrode before the vacuum drying step. By removing these by vacuum drying, an electric double layer is sufficiently formed inside the pore of the powdery activated carbon, thereby obtaining an electric double layer capacitor having a small diffusion resistance between the powdery activated carbon and the electrolyte.

BEST MODE FOR CARRYING OUT THE INVENTION

The process for producing an electric double layer capacitor of the present invention is mainly constituted from: an electrode forming step of kneading powdery activated carbon, a binder, and an organic solvent for lubrication to be shaped into a sheet, a rolling step of piling the shaped electrode to the separator and rolling it to obtain a rolled body, a vacuum drying step of inserting the rolled body into a capacitor case, and thereafter drying the rolled body by a vacuum drying to reduce an organic compound remained in the rolled body until the concentration of the organic compounds becomes to be not more than 300 (ppm) to the weight of the polarized electrode, and a pouring step of pouring an electrolyte into the capacitor case.

Figure 1:
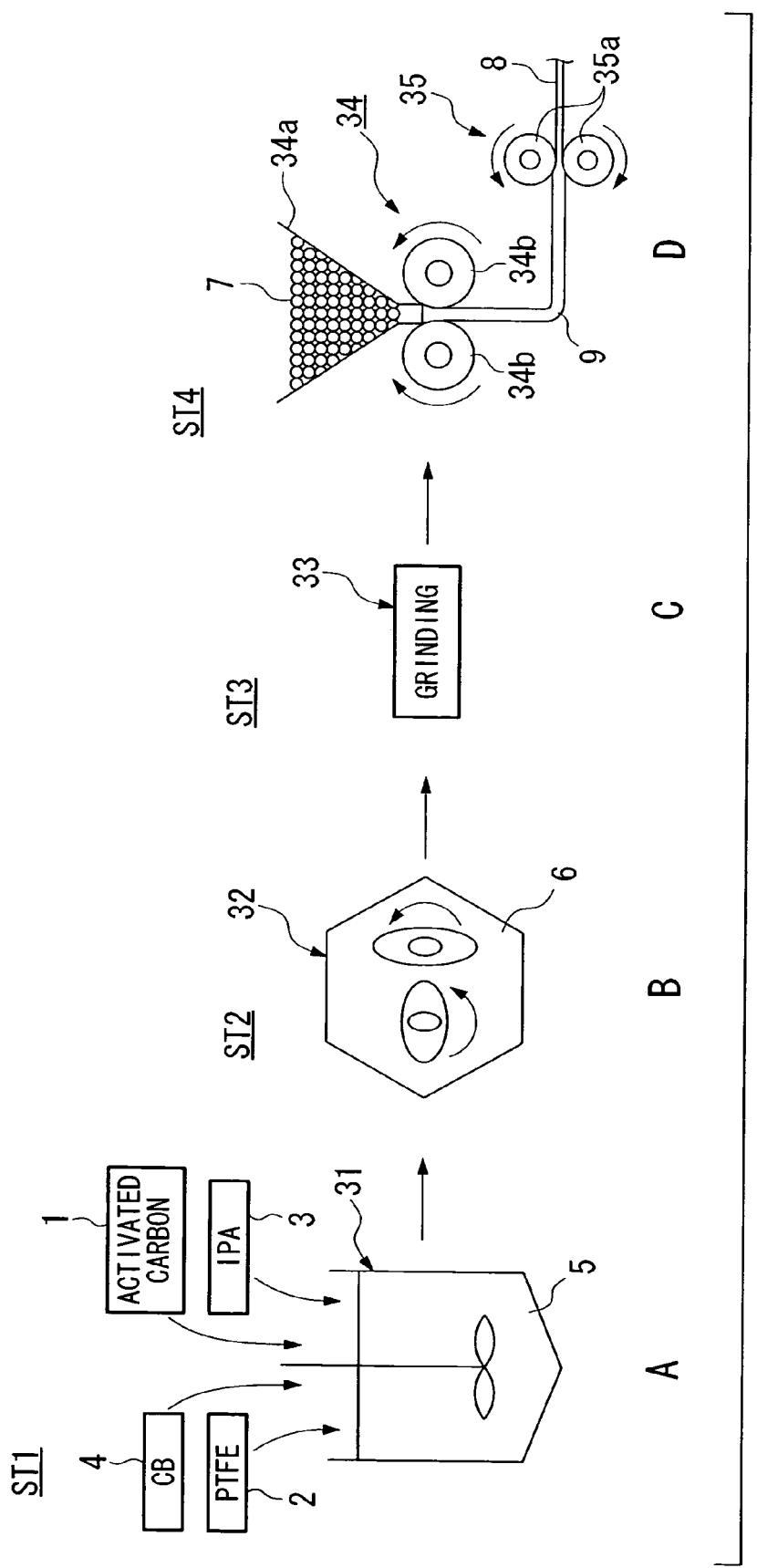
FIG. 1 is a flowchart explaining the producing process for an electric double layer capacitor.
Figure 2:
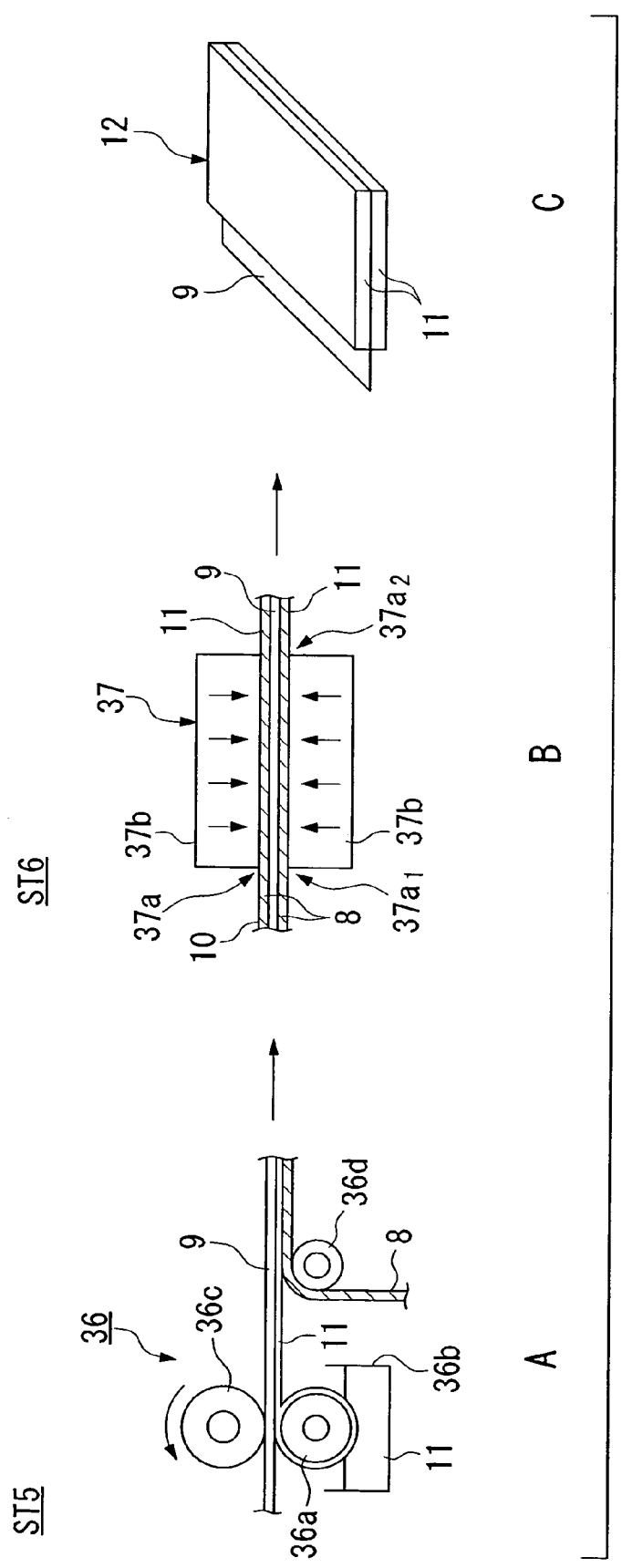
FIG. 2 is a flowchart explaining the producing process for an electric double layer capacitor.
Figure 3:
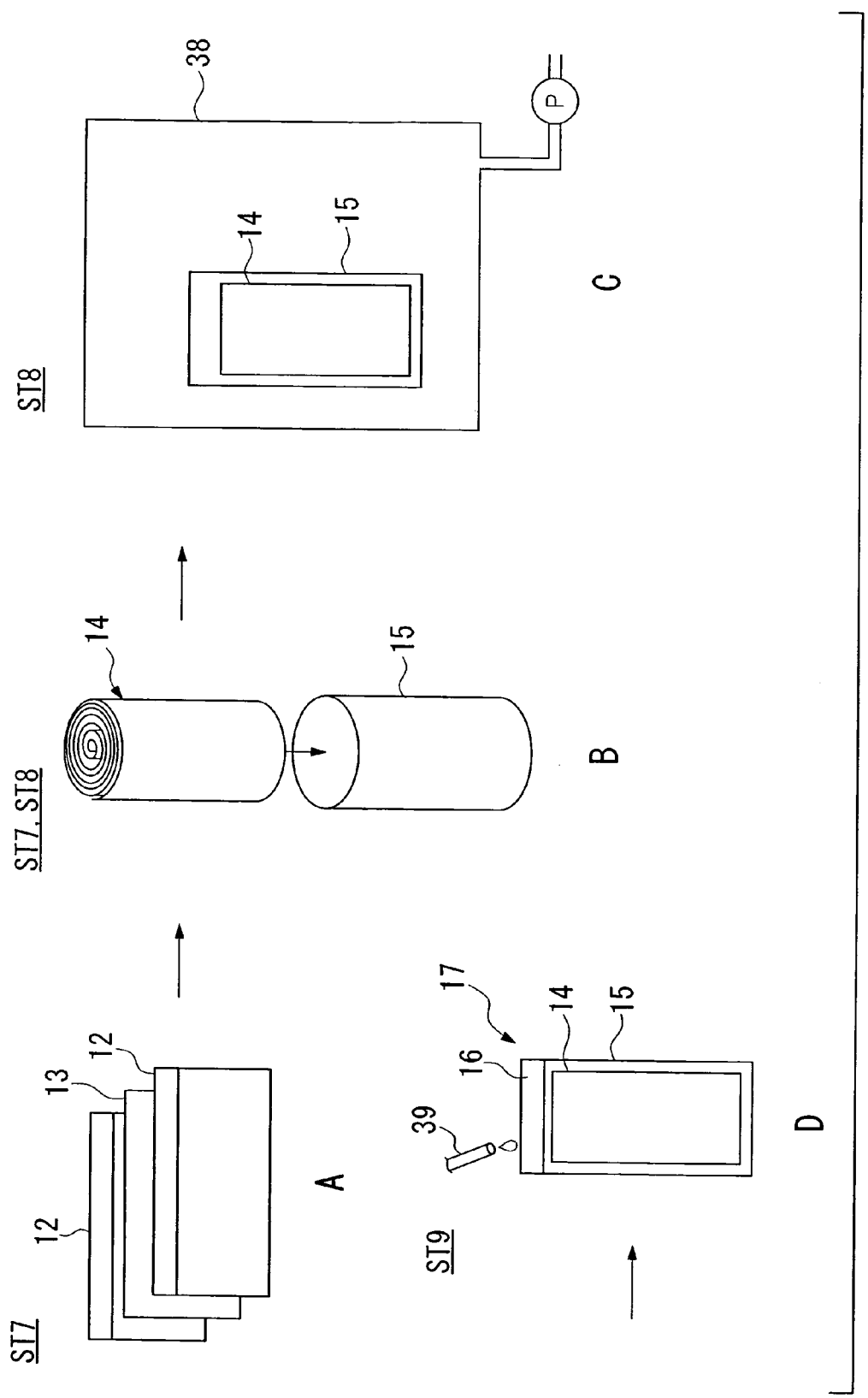
FIG. 3 is a flowchart explaining the producing process for an electric double layer capacitor.

It should be noted that an electrode drying step of heating and removing the organic solvent for lubrication may be performed between the electrode forming step and the rolling step. Flowcharts which explain the contents of each step are shown in FIGS. 1 to 3. Hereafter, referring to FIGS. 1 to 3, each step will be explained sequentially.

In FIG. 1, the flowchart of the electrode forming step for kneading powdery activated carbon, a binder, and an organic solvent for lubrication to be shaped into a sheet is shown. The electrode forming step consists of a raw material mixing step ST1 shown in FIG. 1A, a kneading step ST2 shown in FIG. 1B, a grinding step ST3 shown in FIG. 1C, and a sheeting and rolling step ST4 shown in FIG. 1D.

First, as shown in FIG. 1A, in the raw material mixing step ST1, raw materials of a polarized electrode are fed into a mixer 31 and mixed to obtain mixed power 5. The raw materials to be fed are powdery activated carbon 1, poly fluoridation ethylene 2 (it will be referred to as PTFE2, hereinafter), isopropyl alcohol 3 (it will be referred to as IPA3, hereinafter), and carbon black 4 (it will be referred to as CB4, hereinafter). As the mixer 31, a common mixer having one axis blade, etc., can be employed.

As the activated carbon 1, one which is obtained by calcining a material which can be hardly graphitized, such as phenol resin, to be carbonized, and thereafter performing activating processing thereon (activation processing) by steam, etc., and then ground can be employed. Moreover, the PTFE2 (a binder) is one which is fibrosed in the next kneading step ST2 to bind the powdery activated carbon 1, etc. Moreover, IPA3 (organic solvent for lubrication) promotes mixing of materials, etc., in this step ST1 and the next kneading step ST2. Moreover, CB4 imparts electrical conductivity to a polarized electrode. It should be noted that the organic solvent for lubrication is not limited to IPA, the other alcohols and ketones, etc., may be employed. In addition, as CB4, acetylene black, ketjen black, etc., may be employed.

As for the mixing ratio of each materials, for example, compounding 96 to 50 weight parts of the activated carbon 1, 2 to 20 weight parts of PTFE2, 2 to 80 weight parts of IPA, and 0 to 20 weight parts of CB4, is preferred.

Next, as shown in FIG. 1B, in the kneading step ST2, the mixed powder 5 obtained in the raw material mixing step ST1 is fed into a kneader 32 and kneaded, such that the mixed powder is subjected to shearing force to fibrose PTFE2, thereby forming a lump body 6 of the mixed powder. As the kneader 32, for example, a common kneader having two axes can be employed.

Next, as shown in FIG. 1C, in the grinding step ST3, the lump body 6 obtained in the kneading step ST2 is ground by a grinder 33 to obtain grains. The grinding is preferably performed until the particle diameter of the grain becomes approximately 0.1 to 1 mm, for example. As the grinder 33, for example, a common shearing type grinder can be used.

Next, in the sheeting and rolling step ST4, as shown in FIG. 1D, the grain 7 obtained in the grinding steps ST3 is shaped into a sheet and is rolled so as to have a predetermined thickness to obtain a sheet 8 for electrode. In order to shape the grain 7, the sheet molding apparatus 34 as shown in FIG. 1D is used. This sheet molding apparatus 34 consists of a hopper 34a through which the grain 7 is charged, and a pair of rollers 34b and 34b arranged on the outlet side of the hopper 34a, and the grain 7 is supplied from the outlet of the hopper 34a between the pair of rollers 34b and 34b, thereby compressing the grain 7 to obtain a sheet 9. Then, the sheet 9 is fed to a rolling mill 35 which consists of a pair of rollers 35a, 35a whereby the sheet 9 is rolled to obtain the sheet 8 for electrode. The rolling is preferably performed until the thickness of the sheet 8 for electrode becomes approximately 130 to 160 μm.

Next, the flowchart of the electrode drying step of heating and removing IPA3 (an organic solvent for lubrication) to obtain a polarized electrode is shown in FIG. 2. The electrode drying step consists of a collector adhering step ST5 shown in FIG. 2A, and a continuous drying step ST6 shown in FIG. 2B. Moreover, the perspective view of an electrode is shown in FIG. 2C. It should be noted that although the continuous drying step ST6 is not indispensable for the present invention, by performing this step it becomes possible to reduce the concentration of the organic compound of the electrode for polarization beforehand, thereby shortening the drying time in the vacuum-drying step.

First, in the collector adhering step ST5 shown in FIG. 2A, a collector 19 which consists of aluminum foil is adhered to the sheet 8 for electrodes obtained in the sheeting and rolling step ST4, using an adhering apparatus 36, to obtain an electrode sheet 10. The adhering apparatus 36 is constituted from a transfer roller 36a which applies an adhesive 11 to the collector 19a, an adhesive container 36b which is filled with the adhesive 11 for supplying the adhesive to the transfer roller 36a, a collector feeding roller 36c which is arranged opposite to the transfer roller 36a, and a sheet feeding roller 36d. While feeding the collector 19 by rotating the transfer roller 36a and the collector roller 36c, the adhesive 11 is applied to one surface of the collector 19 by the transfer roller 36a, and then the sheet 8 for electrodes fed by the sheet feeding roller 36d is adhered to one surface of the collector 19 through the adhesive 11. Thus, an electrode sheet 10 is obtained. Although the electrode sheet 10 shown in FIG. 2A is one which is constituted from the collector 19, and the sheet 8 for electrode which is adhered to one surface of the collector 9, the electrode sheet 10 having the powdery activated carbon 1 on both surfaces can be obtained by adhering the sheets 8, 8 for electrode to both sides of the collector 19, respectively, by performing the process ST5 again.

Next, in the continuous drying step ST6 shown in FIG. 2B, the electrode sheet 10 obtained in the collector adhering step S5T is fed into a continuous heating furnace 37 and heated, thereby IPA3 contained in the electrode sheet is heated and removed. Moreover, the adhesive used for adhering the sheet 8 for electrode to the collector 19 in the last process ST5 is dried. The continuous drying furnace 37 consists of a conveying path 37a through which the electrode sheet 10 passes, and a pair of heaters 37b and 37b each of which encounters to each other across the conveying path 37a. The heaters 37b and 37b are arranged along the conveying direction of the conveying path 37a.

Moreover, as the heaters 37b and 37b, heaters having a various type of drying system can be used, for example, those having a warm air drying system, a far-infrared drying system can be used. However, the heater is preferably one which can heat the electrode sheet 10 to a temperature higher than the boiling point of the organic solvent for lubrication (IPA3), whatever drying system of the heater may be used. For example, a heater which can heat the electrode sheet 10 at approximately 150° C. is preferred for heating and removing IPA3.

In order to dry the electrode sheet 10, the electrode sheet 10 is fed into the conveying path 37 from the upper stream side 37a1 of the continuous drying furnace 37, such that the electrode sheet 10 passes between a pair of heaters 37b and 37b to be heated, thereby volatilizing and removing IPA.

In the case in which the continuous drying step ST6 is not performed, almost all of IPA3 will remain as a remaining IPA in the electrode sheet 10.

Whereas, in the case in which the continuous drying step ST6 is performed, most of IPA3 contained in the electrode sheet 10 is heated and removed, such that a slight part thereof remains in the electrode sheet 10 as remaining IPA. Moreover, by the continuous drying step ST6, a part of remaining IPA is etherified on the powdery activated carbon surface to be diisopropyl ether (hereinafter, it is referred to as DIPE), or the remaining IPA is dehydrated in a molecule to be propylene, and these heat denaturated product remain in the electrode sheet 10. Hereinafter, in this specification, "the remaining IPA", "DIPE (heat denaturated product)" and "propylene (heat denaturated product)" are generically named as an "organic compound".

It should be noted that the amount of the organic compound which remains in the electrode sheet 10 after being subjected to the continuous drying step ST6 is preferably reduced to not more than 800 (ppm).

By reducing it to not more than 800 (ppm), even if the drying time of the vacuum-drying step is shortened, the amount of organic compound which remains in the polarized electrode can be certainly reduced to not more than 300 (ppm).

And thereafter, by cutting the electrode sheet 10 into a predetermined length, as shown in FIG. 2C, the electrode object 12 which is constituted from the collector 19, and the polarized electrodes 11, 11 which are adhered to both surfaces, respectively, is obtained.

Next, a rolling step ST7, a vacuum-drying step ST8, and a pouring process ST9 are shown in FIG. 3.

In the rolling step ST7 shown in FIGS. 3A and 3B, the electrode 12 (the polarized electrode 11) and a separator 13 are piled and rolled to obtain a rolled body 14. That is, as shown in FIG. 3A, a separator 13 is arranged between a pair of electrodes 12 and 12, and then as shown in FIG. 3B, the pair of electrodes 12, 12 and the separator 13 are rolled simultaneously to form the rolled body 14.

It should be noted that this rolling step ST7 is performed in the atmosphere of a series of producing processes of an electric double layer capacitor, and hence an electrolytic component (for example, propylene carbonate (it is hereinafter referred to as PC)), acetone, alcohol, etc., which are volatilized in the atmosphere as such, may be adsorbed again to the powdery activated carbon of the polarized electrode 11. In this specification, these volatile component which is adsorbed again and the above remaining IPA, DIPE and propylene, etc., are generically named anew as "organic compound".

Next, in the vacuum-drying step ST8 shown in FIGS. 3B and 3C, the rolled body 14 obtained in the rolling step ST7 is inserted into a capacitor case 15, and thereafter the organic compounds which remain in the rolled body 14 (the polarized electrode 11) are removed until their concentration become not more than 300 (ppm), more preferably within the range of from not less than 150 (ppm) to not more than 300 (ppm) following by vacuum drying. That is, as shown in FIG. 3B, after inserting the rolled body 14 into the metal capacitor case 15 being a hollow cylinder, as shown in FIG. 3C, the rolled body 14 is disposed to within a vacuum dryer 38 together with the capacitor case 15, and thereafter a vacuum drying of the rolled body 14 (the polarized electrode 11) is performed under a pressure of not higher than 10 Pa at a temperature of not lower than 120° C. to not higher than 200° C. The drying time is preferably not less than 40 hours when the continuous drying step ST6 is performed, whereas the drying time is preferably not less than 72 hours when the continuous drying step ST6 is omitted. By this vacuum drying, the organic compounds which remain in the polarized electrode 11 are removed until the concentration thereof become preferably not more than 300 (ppm) to the weight of the polarized electrode, more preferably within the range of from not less than 150 (ppm) to not more than 300 (ppm) to the weight of a polarized electrode. That is, the vacuum drying is performed to remove the organic compounds until the total amount of the re-adsorbed component such as PC, acetone, or alcohol, the remained IPA, DIPE, and propylene, etc., becomes the concentration of not more than 300 (ppm).

If the concentration of the organic compounds is more than 300 (ppm), since formation of the electric double layer by adsorption of electrolytic ion is prevented, the diffusion resistance between the powdery activated carbon 1 and the electrolyte will increase and the electrode performance as the polarized electrode 11 for electric double layer capacitor will deteriorate, and hence it is not preferred. Moreover, although the concentration of the organic compounds is most preferably 0 (ppm), it is actually difficult to reduce the concentration to be less than 150 (ppm) due to the high adsorbing power of the activated carbon. If the concentration of the organic compounds is within a range of 150 to 300 (ppm), there will be no possibility that formation of the electric double layer may not be prevented enormously, such that the diffusion resistance between the powdery activated carbon and the electrolyte may become excessive to deteriorate the electrode performance enormously.

Finally, in the pouring step ST9 shown in FIG. 3D, the electrolyte is poured from a nozzle 39 and a sealing member 16 is further joined to the capacitor case 15 by welding, etc. Thus, an electric double layer capacitor 17 is obtained. It should be noted that as the electrolyte, a solution obtained by dissolving a quaternary ammonium salt in PC may be employed.

The polarized electrode 11 for the electric double layer capacitor is one which is obtained by mixing PTFE 2 with the activated carbon 2, such that the concentration of organic compounds, such as the remained IPA, DIPE, propylene, PC, acetone, alcohols, etc., is not higher than 300 (ppm). Therefore, this polarized electrode 11 can reduce the amount of organic compounds which remain in the pore of the powdery activated carbon, thereby eliminating the possibility that formation of the electric double layer by adsorption of electrolytic ion may be prevented. Thus, the electric double layer is sufficiently formed inside the pore of the powdery activated carbon, thereby-increasing the diffusion resistance between the powdery activated carbon and the electrolyte.

It should be noted that although the concentration of the organic compounds is most preferably 0 (ppm), it is actually difficult to reduce the concentration to be less than 150 (ppm) due to the high adsorption power of the activated carbon. Therefore, if the range of the concentration of the organic compound is within a range from 150 to 300 (ppm), there will be no possibility that formation of the electric double layer may be prevented enormously, and that the diffusion resistance between the powdery activated carbon and the electrolyte becomes excessive to deteriorate the electrode performance enormously.

Moreover, according to the process for producing the above polarized electrode, the remaining IPA which remains after the electrode forming steps ST1 to ST4 is removed until the concentration thereof becomes not more than 300 (ppm) by the vacuum-drying step ST8, and hence it becomes possible to reduce the amount of the organic compounds which remain in the pore of the powdery activated carbon, which leads to eliminate the possibility that formation of the electric double layer by adsorption of the electrolytic ion to the powdery activated carbon may be prevented. Thereby, the electric double layer is sufficiently formed inside the pore of the powdery activated carbon, and as a result, the polarized electrode 11 having a small diffusion resistance between the powdery activated carbon and the electrolyte is obtained.

Moreover, if the continuous drying step ST6 is performed after the electrode forming steps ST1 to ST4, the great part of the remaining IPA can be removed before the vacuum-drying step. Thereby, organic compounds, such as the remained IPA and DIPE as a by-product which could not removed in the electrode drying step, can be easily removed until the concentration thereof becomes not more than 300 (ppm) by the vacuum-drying step. Moreover, vacuum-drying conditions can be shortened. By this, it becomes possible to reduce further the amount of the organic compounds which remain in the pore of the powdery activated carbon, and as a result, an electric double layer is sufficiently formed inside the pore of the powdery activated carbon, thereby obtaining the polarized electrode 11 of having a diffusion resistance between the powdery activated carbon and the electrolyte which is further reduced.

Moreover, according to the above process for producing the electric double layer capacitor 17, there is no possibility that the organic compounds contained in the atmosphere of a series of manufacturing steps may stick again to the polarized electrode 11 by performing the vacuum-drying step ST8 just before the pouring step ST9.

Moreover, according to the above producing process for the electric double layer capacitor 17, before the vacuum-drying step ST8, in the polarized electrode 11, at least the remaining IPA is adsorbed, and DIPE which is a heat denaturated product which is formed by heating the remaining IPA at an early stage of the vacuum-drying step ST8 is adsorbed, and a small amount of volatile organic substances contained in the atmosphere of a series of manufacturing steps is also absorbed. By removing these through vacuum drying, an electric double layer is sufficiently formed inside the fine pore of the powdery activated carbon, and as a result, the electric double layer capacitor 17 having a smaller diffusion resistance between the powdery activated carbon and the electrolyte is obtained.

EXPERIMENTATION EXAMPLE 1

Examination of the Drying Conditions in the Vacuum-Drying Step (Manufacturing of the Electric Double Layer Capacitor of Working Example 1)

First, powdery activated carbon was manufactured as follows. First, carbonization processing was performed by holding a phenol resin at 900° C. in a nitrogen flow for 2 hours. Next, thus obtained raw material carbon was heated again in a nitrogen flow, when the temperature reached 800° C., while flowing a nitrogen mixed gas which contains 5% of steam and 5% of carbon dioxide, it was kept at 900° C. for 2 hours to perform an activation. And thus obtained activated carbon was ground by a ball-milling grinder until average particle diameter thereof became approximately 2 to 15 micrometers to obtain powdery activated carbon.

Next, the electrode forming step, in which thus obtained powdery activated carbon and a binder (poly 4 fluorinated ethylene) and an organic solvent for lubrication (isopropyl alcohol (IPA)) were kneaded and shaped into a sheet, was performed. That is, 8 weight parts of powdery poly 4 fluorinated ethylene (for example, Teflon 6J (registered trademark) produced by Mitsui du Pont Fluoro Chemical Co., Ltd.), and 8 weight parts of acetylene black (for example, DENKA BLACK (registered trademark) produced by DENKI KAGAKU KOGYO K.K.) were mixed with 84 weight parts of thus obtained powdery activated carbon. To this mixture, 10 weight parts of IPA was further added and mixed (raw material mixing step), and then a compressing kneading was performed (kneading step) for 8 minutes using a two-rolls kneader, thereby fibrillating poly 4 fluorinated ethylene to obtain a lump body.

Thus obtained lump body was ground by a shearing type grinder to obtain grains having average diameter of approximately 1 mm (grinding step). Thus obtained grains were subjected to a sheeting, and thereafter were rolled to obtain a long sheet for electrodes having a width of 110 mm (sheeting and rolling step).

Next, after adhesives (for example, G-5780A produced by No Tape Industrial Co., Ltd.) were applied to both sides of aluminum foil (a collector) having a width of 115 mm, the sheets for electrodes obtained above were adhered to both sides of the collector to obtain the electrode sheet (the collector adhering step).

Next, the electrode sheet was cut into a piece having a length of 1200 mm to obtain an electrode, and two sheets of such an electrode were prepared. Next, a separator having a thickness of 50 μm made of rayon was inserted between two pieces of the electrode, and then the electrode and the separator were rolled spirally to obtain a rolled body (the rolling step). Thus obtained rolled body was inserted into a hollow cylindrical capacitor case having an inner diameter of 50 mm and a height of 130 mm.

Next, the capacitor case which accommodated the rolled body was put in a vacuum dryer, and vacuum drying was performed under a condition of a pressure of 1 Pa, at 160° C., for 72 hours (the vacuum-drying step).

Next, an electrolyte in which a quaternary ammonium salt (triethyl methyl ammonium tetra fluoro borate) was dissolved in PC at a concentration of 1.8 mols/L was prepared, and then this electrolyte was poured into the capacitor case after being subjected to a vacuum drying (the pouring step), and thereafter opening of the capacitor case was sealed with a sealant to produce an electric double layer capacitor of Working Example 1.

(Production of the Electric Double Layer Capacitor of Working Example 2)

An electric double layer capacitor of Working Example 2 was produced by the same process as in Working Example 1 with the exception of setting the drying time in the vacuum-drying step to be 96 hours.

(Production of the Electric Double Layer Capacitor of Working Example 3)

An electric double layer capacitor of Working Example 3 was produced by the same process as in Working Example 1 with the exception of setting the drying time in the vacuum-drying step to be 120 hours.

(Production of the Electric Double Layer Capacitor of Comparative Example 1)

An electric double layer capacitor of Comparative Example 1 was produced by the same process as in Working Example 1 with the exception of setting the drying time in the vacuum-drying process to be 24 hours.

(Production of the Electric Double Layer Capacitor of Comparative Example 2)

An electric double layer capacitor of Working Example 2 was produced by the same process as in Working Example 1 with the exception of setting the drying time in the vacuum-drying step to be 48 hours.

(Production of Comparative Example 3 Electric-Double-Layer Capacitor)

An electric double layer capacitor of Comparative Example 3 was produced by the same process as in Working Example 1 with the exception of setting the drying time in the vacuum-drying process to be 144 hours.

(Analysis of Organic Compounds in the Polarized Electrode)

Figure 4:
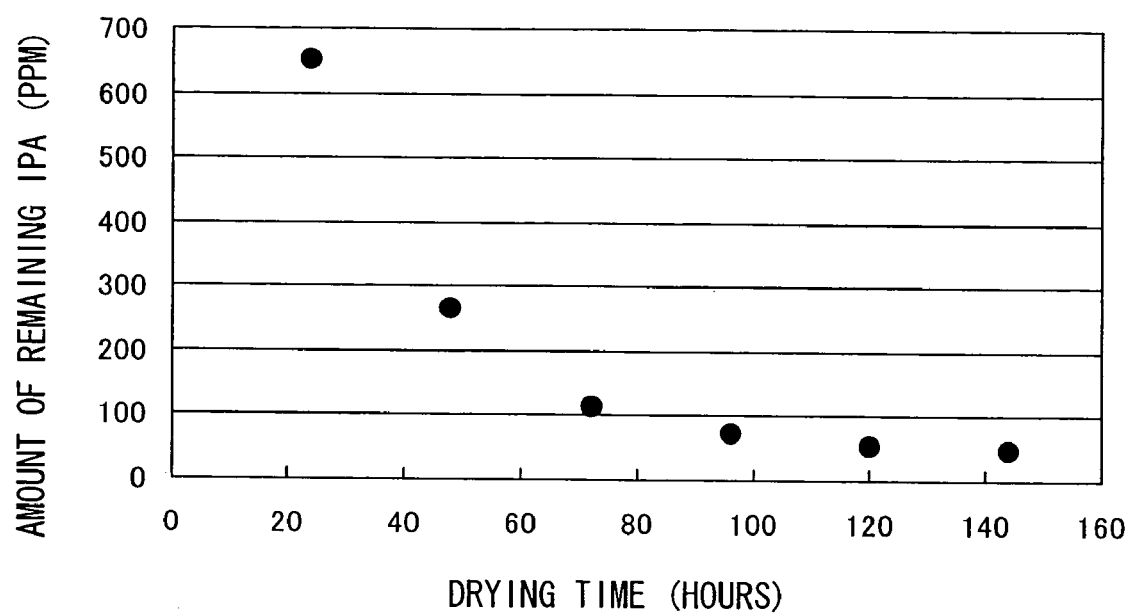
FIG. 4 is a graph which shows the correlation between the amount of remaining IPA which remained in the polarized electrode, and the drying time of vacuum drying.
Figure 5:
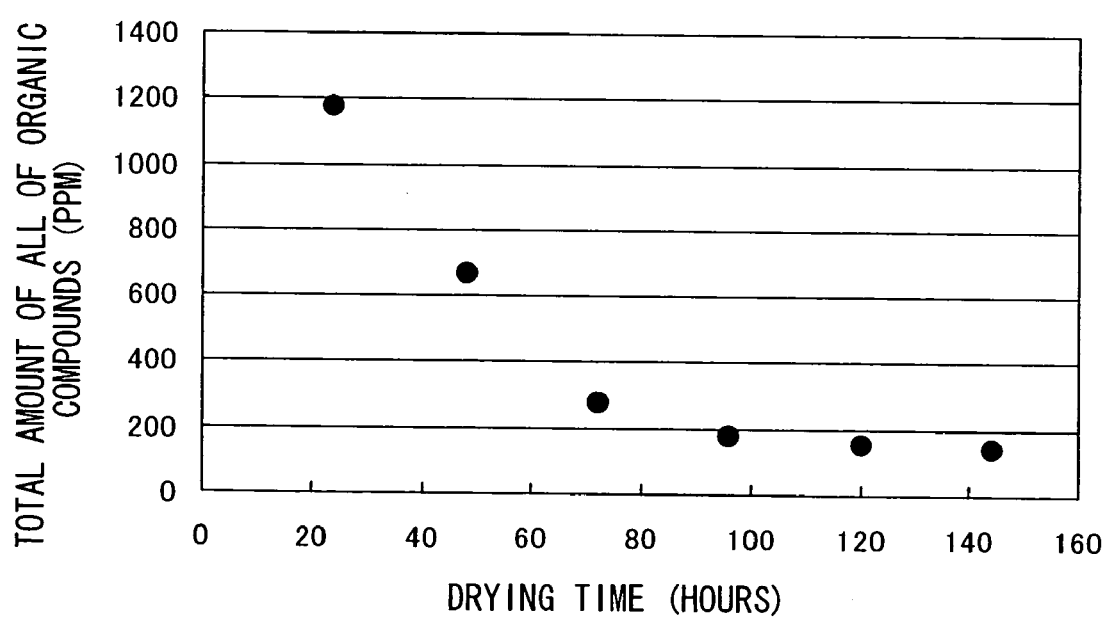
FIG. 5 is a graph which shows the correlation between all of the amount of organic compounds which remained in the polarized electrode, and the drying time of vacuum drying.

A part of the polarized electrode after the vacuum-drying step was sampled, and this sample was charged into a sampling pipe of a heat desorbing apparatus, model ATD400, produced by Perkin-Elmer Co., Ltd., while flowing helium gas, it was heated at 350° C. for 10 minutes to collect components evaporated therefrom by an internal trap. This component was introduced into gas chromatograph equipment, and the evaporated components (organic compounds) were analyzed. The column used for the gas chromatograph was model SPB-1 produced by Spelco Co., Ltd. (with a length of 60 m, inner diameter of 0.25 mm, and film thickness of 25 μm). A hydrogen flame detector (FID) was used as a detector, and quantitative determination was calibrated by the intensity of pentene, assuming that the peak intensity by FID was proportioned to a carbon number. It should be noted that, qualitative analysis of each peak was performed by mass spectroscopy. The result of analysis is shown in FIGS. 4 and 5 and Table 1.

(Characteristic Test of the Electric Double Layer Capacitor)

Figure 6:
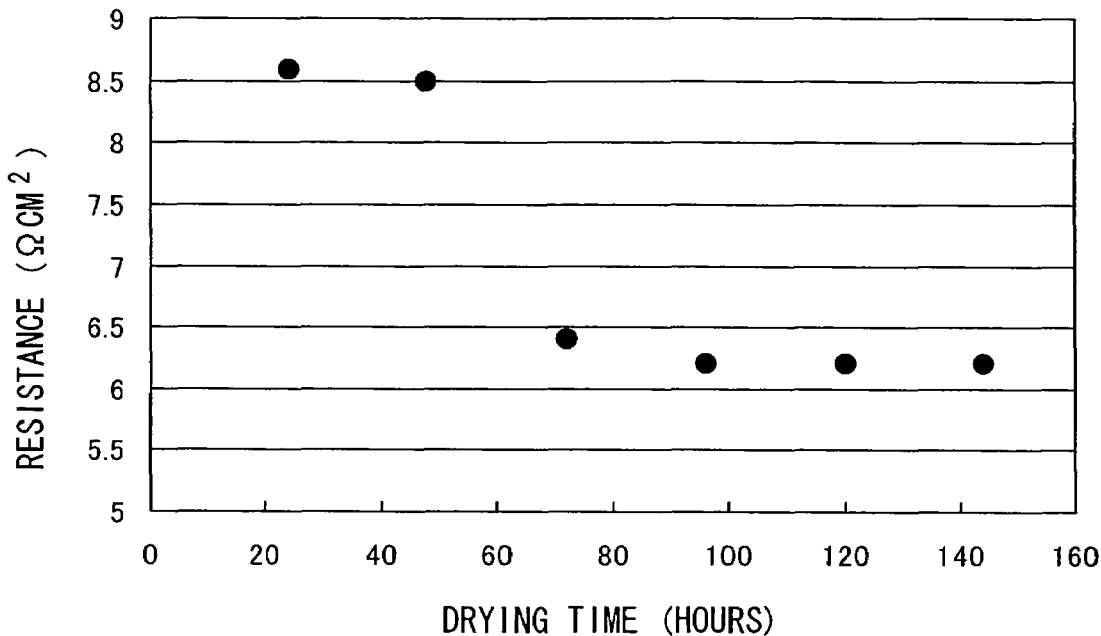
FIG. 6 is a graph which shows the correlation between the initial resistance of the internal resistance of an electric double layer capacitor, and the drying time of the vacuum drying.
Figure 7:
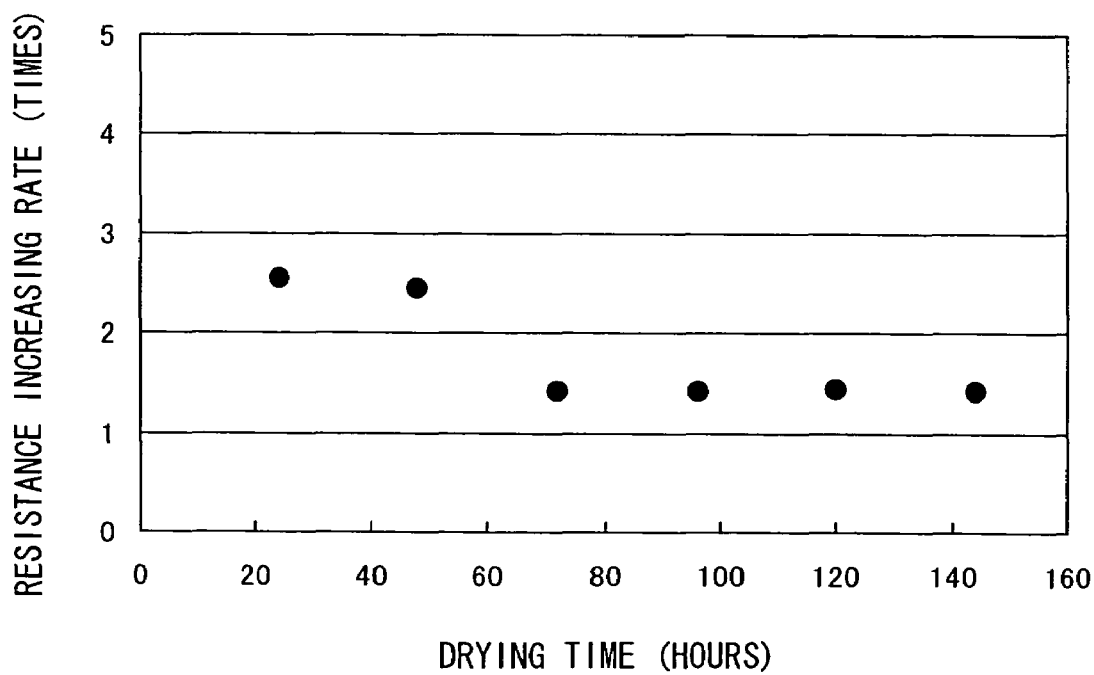
FIG. 7 is a graph which shows the correlation between the resistance increasing rate of an electric double layer capacitor, and the drying time of vacuum drying.

As to the electric double layer capacitors of Working Examples 1 to 3 and Comparative Examples 1 to 3, aging treatment was performed at 60° C., and thereafter the resistance of initial internal resistance was measured. It was charged at 30 mA of charging current, until the terminal voltage became 2.5V, and the resistance after being allowed to stand at 45° C. for 1000 hours, while maintaining the terminal voltage at 2.5V was measured. And the increasing rate of the resistance from the initial stage to 1000 hours later was calculated. The result is shown in FIGS. 6 and 7 and Table 2.

(Analysis Result of Organic Compounds)

As a result of analysis by a gas chromatograph, it was turned out that the detected main organic compounds were isopropyl alcohol (IPA), diisopropyl ether (DIPE), propylene, isopropyl acetate, ethanol, acetone, and acetaldehyde. In these compounds, DIPE, propylene, and isopropyl acetate are considered to be the compounds which are generated by oxidizing, dehydrating, condensing the isopropyl alcohol which was used as an organic solvent for kneading at the vacuum-drying step. Moreover, it is thought that ethanol and acetone are the components which are absorbed in the activated carbon out of the atmosphere of the manufacturing process of the capacitor. Moreover, it is thought that oxidization of ethanol generated acetaldehyde.

The correlation between the detected amount of IPA, i.e., the amount of IPA (it will be expressed as the remaining IPA, hereinafter) which remained in the polarized electrode after vacuum drying, and the vacuum-drying time is shown in FIG. 4. Moreover, the correlation between the total of amount of all of organic compounds, i.e., total of amount of all of organic compounds which remained in the polarized electrode after vacuum drying, and the vacuum-drying time is shown in FIG. 5. Moreover, the correlation between the amount of remained IPA, the total of all organic compouns, and the vacuum-drying time are shown in Table 1.

As shown in FIG. 4, it turns out that the remaining IPA decreases as the drying time increases. Particularly, as shown in the FIG. 5, it turns out that when the drying time is 72 hours, the amount of organic compounds becomes 279 (ppm), whereas when the drying time becomes not less than 72 hours, the total amount of all of organic compounds becomes not more than 300 (ppm). Moreover, it turns out that when the drying time becomes not less than 120 hours, the total amount of all of organic compounds becomes approximately 150 (ppm) and almost constant. This shows that reduction of the organic compound by adsorption of the activated carbon beyond this is difficult.

TABLE 1

| | Drying time (hours) | Remaining IPA (ppm) | The total amount (ppm) of organic compounds |
|---|---|---|---|
| Working Example 1 | 72 | 114 | 279 |
| Working Example 2 | 96 | 72 | 182 |
| Working Example 3 | 120 | 54 | 153 |
| Comparative Example 1 | 24 | 653 | 1175 |
| Comparative Example 2 | 48 | 265 | 671 |
| Comparative Example 3 | 144 | 48 | 144 |

(Characteristics of the Electric Double Layer Capacitor)

Next, the correlation between the initial resistance of the internal resistance of the capacitor and the vacuum-drying time is shown in FIG. 6, and the correlation between the resistance increasing rate of 1000 hours after and the vacuum-drying time is shown in FIG. 7.

As shown in FIG. 6, it turns out that when the drying time becomes not less than 40 hours, the initial resistance decreases from approximately 8.5 $\Omega cm^2$ to approximately 6.3 $\Omega cm^2$ suddenly, and the resistance becomes almost constant thereafter. Moreover, as shown in FIG. 7, it turns out that when the drying time becomes not less than 40 hours, the resistance increasing rate decreases from approximately 2.5 times of the initial value thereof, which is regarded to be 1, to approximately 1.5 times suddenly, and becomes almost constant thereafter.

Considering the results of FIGS. 6 and 7 together with the analytical result of the organic compound, it turns out that when the concentration of the organic compound which remains in the polarized electrode become less than 300 (ppm), the initial resistance of the capacitor and the resistance increasing rate after 1000 hours can be reduced enormously.

It can be thought that this is because the amount of the organic compounds which remain in the pore of the powdery activated carbon decreases, such that the electric double layer is sufficiently formed inside the pore of the powdery activated carbon to decrease the diffusion resistance between the powdery activated carbon and the electrolyte.

It should be noted that, when the drying time is not less than 120 hours, the total amount of the organic compounds becomes approximately 150 (ppm) and the initial resistance and the resistance increasing rate become almost constant at 120 hours, and hence it turns out that if the total amount of the organic compounds is reduced to approximately 150 (ppm), a mostly satisfying result can be obtained.

TABLE 2

| | Drying time (hours) | Initial resistance ($\Omega$ cm$^2$) | Resistance increasing rate (times) |
|---|---|---|---|
| Working Example 1 | 72 | 6.4 | 1.42 |
| Working Example 2 | 96 | 6.2 | 1.42 |
| Working Example 3 | 120 | 6.2 | 1.43 |
| Comparative Example 1 | 24 | 8.6 | 2.56 |
| Comparative Example 2 | 48 | 8.5 | 2.45 |
| Comparative Example 3 | 144 | 6.2 | 1.42 |

EXPERIMENT EXAMPLE 2

The Effect when the Continuous Drying Step is Performed (Production of the Electric Double Layer Capacitor of Working Example 4)

The electric double layer capacitor of Working Example 4 was produced similarly to Working Example 1, excepting that the electrode sheet after the collector adhering step was introduced into a hot wind type continuous drying furnace to perform continuous drying (the continuous drying step) under a condition of spraying hot wind at a temperature of 150° C. for 4 minutes at a flow rate of 10 L/minute, and the vacuum-drying step was performed for 48 hours.

(Production of the Electric Double Layer Capacitor of Comparative Example 4)

The electric double layer capacitor of Comparative Example 4 was produced similarly to Working Example 1, with the exception of performing no continuous drying step, and changing the drying time of the vacuum-drying step to be 48 hours. It should be noted that Comparative Example 4 is the same as Comparative Example 2 in Experimental Example 1.

As to Working Example 4 and Comparative Example 4, analysis of organic compounds through a gas chromatograph was performed similarly to Experimental Example 1, and simultaneously, analysis of water content was performed using Carl Fischer apparatus. The analytical result of the polarized electrode of Working Example 4 is shown in Table 3. The units of the numerical value in Table 3 are all (ppm).

Moreover, as to Working Example 4 and Comparative Example 4, the initial resistance and the resistance increasing rate were measured similarly to Experimental Example. The result is shown in Table 4.

TABLE 3

|  | Before sheet-like drying | After sheet-like drying | Before vacuum drying | After vacuum drying |
|---|---|---|---|---|
| Isopropyl alcohol | 1500 | 440 | 436 | 67 |
| Diisopropyl alcohol | 0 | 12 | 12 | 28 |
| Diisopropyl acetate | 0 | 15 | 14 | 30 |
| Propylene | 0 | 16 | 17 | 37 |
| Ethanol | 120 | 25 | 86 | 13 |
| Acetone | 357 | 72 | 170 | 59 |
| Acetaldehyde | 12 | 45 | 65 | 10 |

TABLE 4

|  | Initial resistance ($\Omega \cdot cm^2$) | Resistance increasing rate (times) |
|---|---|---|
| Working Example 4 | 6.1 | 1.23 |
| Comparative Example 4 | 7.3 | 1.45 |

As shown in Table 3, the detected main organic compounds were isopropyl alcohol (IPA), diisopropyl ether (DIPE), propylene, isopropyl acetate, ethanol, acetone, and acetaldehyde. In these, DIPE, propylene, and isopropyl acetate are considered to be derived from oxidation, dehydration, or condensation, etc., of isopropyl alcohol, in the continuous drying step and the vacuum-drying step. Moreover, it is thought that ethanol, acetone, etc. are the components which are adsorbed from the atmosphere of the process for producing the capacitor. Moreover, it is thought that acetaldehyde is derived mainly from oxidization of ethanol.

As shown in Table 3, it turns out that by performing the continuous drying and the vacuum drying, the amount of each organic compound is reduced gradually.

Moreover, as shown in Table 4, the initial resistance and the resistance increasing rate of the capacitor of Working Example 4 have become less than those of Comparative Example 4, and hence it turns out that the removal effect of the organic compound by the continuous drying step is acquired.

Figure 8:
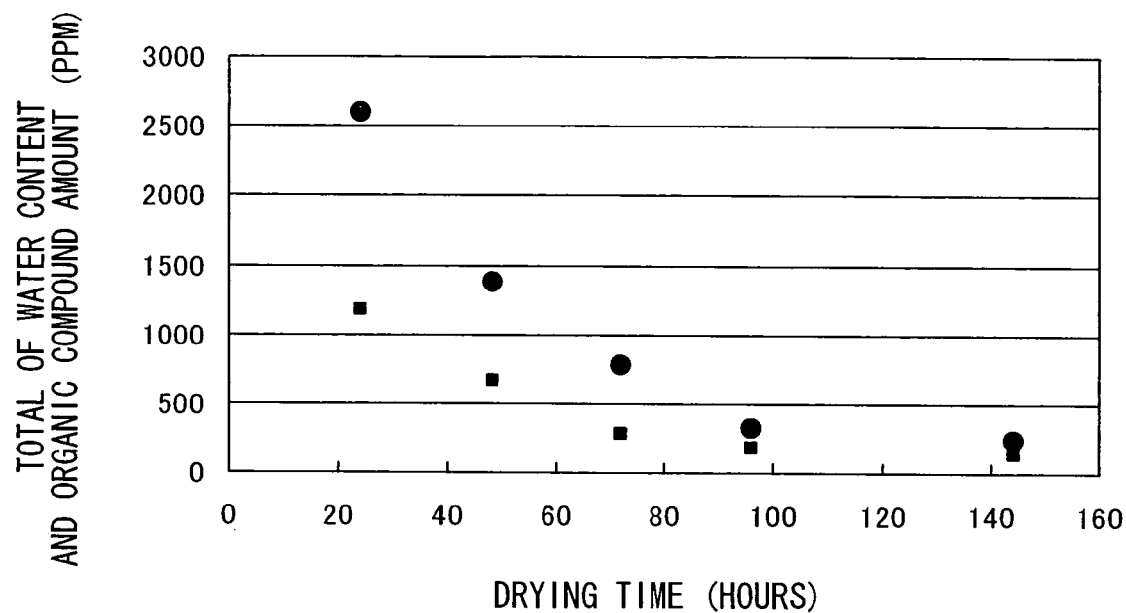
FIG. 8 is a graph which shows the correlation between the total amount of the organic compounds and water contained in the polarized electrode after a vacuum-drying step when not performing the continuation dryness step, and the drying time of vacuum drying.

Furthermore, with the exception of setting the drying time of the vacuum-drying step to be 24, 72, 96 and 144 hours, the polarized electrode was produced similarly to Comparative Example 4, and the total amount of the organic compound contained in the polarized electrode and the water content were analyzed. In FIG. 8, the dependency of the total of the amount of the organic compound and the water content contained in the polarized electrode after the vacuum-drying step without performing the continuous drying step, on the vacuum-drying time is shown.

Figure 9:
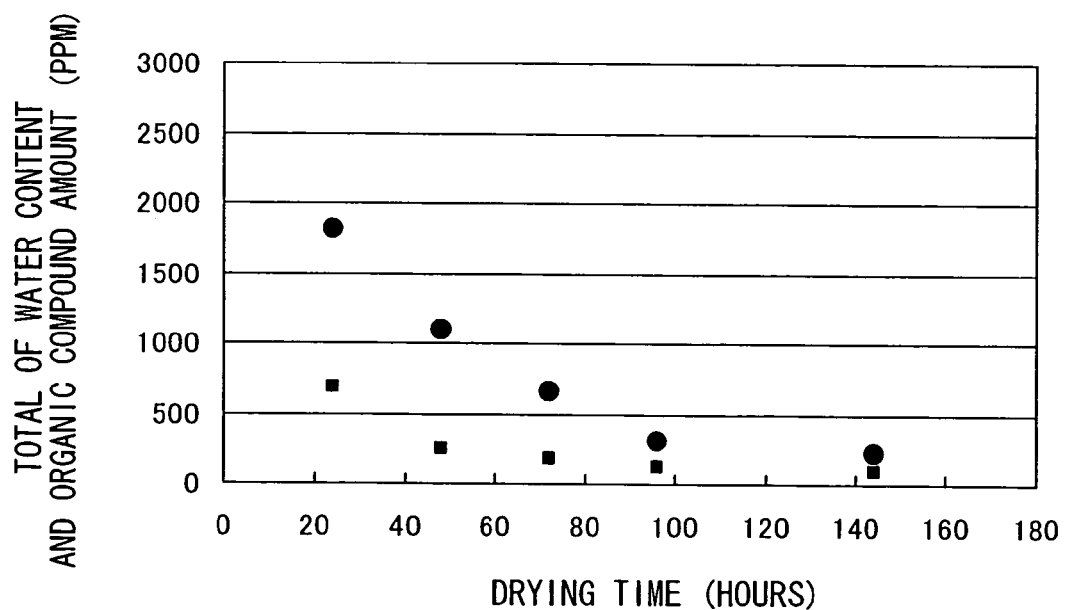
FIG. 9 is a graph which shows the correlation between the total amount of the organic compounds and water contained in the polarized electrode after the vacuum-drying step at the time of performing the continuous drying step, and the drying time of the vacuum drying.

Similarly, with the exception of setting the drying time of the vacuum-drying step to be 24, 72, 96, and 144 hours, the polarized electrode was produced similarly to Working Example 4, and the total amount of the organic compound contained in the polarized electrode and the water content were analyzed. In FIG. 9, the dependency of the total of amount of the organic compound and the water content contained in the polarized electrode after the vacuum-drying process with performing the continuous drying step is shown. It should be noted that, in FIGS. 8 and 9, the plot of black dots shows the water content, and the plot of black quadrangles shows the amount of organic compounds.

As shown in FIG. 9, when the continuous drying step is performed, the amount of the organic compound becomes not more than 300 (ppm) by the vacuum drying for 48 hours, whereas as shown in FIG. 8, when not performing the continuous drying step, the amount of the organic compound has become not more than 300 (ppm) by the vacuum drying for 72 hours. Thus, it turns out that when the continuous drying step is performed, the vacuum-drying time can be reduced.

INDUSTRIAL APPLICABILITY

As explained in detail above, according to the polarized electrode for the electric double layer capacitor of the present invention, since the concentration of the organic compound contained in the polarized electrode is not more than 300 (ppm), the amount of organic compounds which remain in the pore of the powdery activated carbon is reduced, and the possibility that formation of the electric double layer by adsorption of electrolytic ion may be prevented is eliminated. Thereby, the electric double layer is sufficiently formed inside the pore of the powdery activated carbon, and the diffusion resistance between the powdery activated carbon and the electrolyte becomes low. By this, the electric double layer capacitor having a large electrostatic capacity and a low internal resistance can be obtained.

Moreover, according to the producing process for the polarized electrode of the present invention, the organic compounds, such as organic solvents for lubrication which remain after the electrode forming step, are removed until concentration thereof become not more than 300 (ppm) by the vacuum-drying step, and hence it becomes possible to reduce the amount of organic compounds which remain in the pore of the powdery activated carbon, and a possibility that formation of the electric double layer by adsorption of the electrolytic ion to the powdery activated carbon may be prevented is eliminated. Thereby, the electric double layer is sufficiently formed inside the pore of the powdery activated carbon, and a polarized electrode having a low diffusion resistance between the powdery activated carbon and the electrolyte can be obtained.

Moreover, according to the producing process for the electric double layer capacitor of the present invention, since the vacuum-drying step is performed just before the pouring step, there is no possibility that the organic impurities contained in the atmosphere of a series of producing process may be adsorbed again to the polarized electrode, and an electric double layer capacitor having a low internal resistance can be obtained.

The invention claimed is:

1. A polarized electrode for an electric double layer capacitor comprising a mixture of powdery activated carbon, an organic solvent for lubrication and a binder, wherein the concentration of an organic compound contained in the polarized electrode after drying is not more than 300 (ppm) to the weight of the polarized electrode, and wherein the organic compound contains at least the organic solvent for lubrication which remains after the electrode is formed, and a thermal denaturated product which is generated by heating the organic solvent for lubrication during drying.

2. A polarized electrode for electric double layer capacitor as set forth in claim 1, wherein the concentration of an organic compound contained in the polarized electrode is ranging from not less than 150 (ppm) to not more than 300 (ppm) to the weight of the polarized electrode.

3. A process for producing a polarized electrode for an electric double layer capacitor including an electrode forming step of kneading powdery activated carbon, a binder, and an organic solvent for lubrication to be shaped into a sheet, further comprising, after the electrode forming step, a vacuum drying step of reducing an organic compound remained in the electrode by a vacuum drying until the concentration thereof is not more than 300 (ppm) to the weight of the polarized electrode, wherein the organic compound contains at least the organic solvent for lubrication which remains after the electrode forming step, and a thermal denaturated product which is generated by heating the organic solvent for lubrication in the vacuum drying step.

4. A process for producing a polarized electrode for an electric double layer capacitor constituted from a pair of polarized electrodes prepared by mixing powdery activated carbon with a binder; a separator disposed to between the pair of polarized electrodes; and an electrolyte, comprising:

an electrode forming step of kneading powdery activated carbon, a binder, and an organic solvent for lubrication to be shaped into a sheet, a rolling step of piling the shaped electrode to the separator and rolling it to obtain a rolled body, a vacuum drying step of inserting the rolled body into a capacitor case, and thereafter drying the rolled body by a vacuum drying to reduce an organic compound remained in the rolled body until the concentration of the organic compound becomes to be not more than 300 (ppm) to the weight of the polarized electrode, and a pouring step of pouring an electrolyte into the capacitor case.

5. A process for producing a polarized electrode for an electric double layer capacitor as set forth in claim 4, wherein the organic compound contains at least the organic solvent for lubrication which remains after the electrode forming step, and a thermal denaturated product which is generated by heating the organic solvent for lubrication in the vacuum drying step.

* * * * *